US005710908A

United States Patent [19]

Man

[11] Patent Number: 5,710,908

[45] Date of Patent: Jan. 20, 1998

[54] ADAPTIVE NETWORK PROTOCOL INDEPENDENT INTERFACE

[75] Inventor: Chiu Ming Man, Anaheim, Calif.

[73] Assignee: Canon Kabushiki Kaisha, Tokyo, Japan

[21] Appl. No.: 495,172

[22] Filed: Jun. 27, 1995

[51] Int. Cl.[6] .................... H04L 29/06

[52] U.S. Cl. .................... 395/500

[58] Field of Search .................... 395/500, 200.15, 395/200.02, 200.03, 117, 602, 614, 284, 285, 286, 200.19, 200.2, 200.1; 370/389, 401, 455

[56] References Cited

U.S. PATENT DOCUMENTS

| | | | |
|---|---|---|---|
| 4,855,905 | 8/1989 | Estrada et al. . | |
| 5,182,748 | 1/1993 | Sakata et al. . | |
| 5,305,317 | 4/1994 | Szczepanek . | |
| 5,321,819 | 6/1994 | Szczepanek . | |
| 5,323,392 | 6/1994 | Ishii et al. . | |
| 5,408,609 | 4/1995 | Malgogne et al. . | |
| 5,410,535 | 4/1995 | Yang et al. . | |
| 5,425,028 | 6/1995 | Britton et al. | 370/389 |
| 5,430,727 | 7/1995 | Callon | 370/401 |
| 5,491,693 | 2/1996 | Britton et al. | 370/401 |
| 5,491,694 | 2/1996 | Oliver et al. | 370/455 |
| 5,509,123 | 4/1996 | Dobbins et al. | 395/200.15 |
| 5,526,489 | 6/1996 | Nilakantan et al. | 395/200.02 |

OTHER PUBLICATIONS

SK–Passport User's Manual, Syskonnect, Inc., Saratoga, CA, 1992.

*Primary Examiner*—Kevin J. Teska

*Assistant Examiner*—Dan Fiul

*Attorney, Agent, or Firm*—Fitzpatrick, Cella, Harper & Scinto

[57] ABSTRACT

A protocol independent method of transmitting a data packet from a first application program executing on a first device which is interfaced to a LAN to a second application program executing on a second device which is interfaced to the LAN. A protocol independent interface (PII) program is initialized which determines which protocols are available for use, assigns an access line to each protocol that is available for use, assigns an access ID to the first application program, and creates mapping information that indicates a one-to-one correspondence between an access ID/access line pair and a block of protocol specific information which includes a protocol header having predetermined address data. A data packet is sent to the PII program together with the access ID of the first application program and a destination ID for the second application program, and one of the available protocols is selected to transmit the data packet. A block of protocol specific information is retrieved from the mapping information based on the access ID of the first application program and the access line corresponding to the selected protocol, and a transmission packet is formed which includes the data packet, the destination ID, and the retrieved block of protocol specific information. The transmission packet is then transmitted via the LAN.

43 Claims, 12 Drawing Sheets

FIG. 7A

| PROTOCOL | ACCESS LINE # |
|---|---|
| UDP | 1 |
| IPX | 2 |
| DDP | 3 |

FIG. 7B

| PROTOCOL | ACCESS LINE # |
|---|---|
| UDP | 2 |
| IPX | 3 |
| DDP | 1 |

FIG. 8A

| PROGRAM | ACCESS ID # |
|---|---|
| CMIP MANAGER | XXXX1 |
| SNMP MANAGER | XXXX2 |

FIG. 8B

| PROGRAM | ACCESS ID # |
|---|---|
| CMIP AGENT | YYYY2 |
| SNMP AGENT | YYYY1 |

| ACCESS ID/ACCESS LINE | PROTOCOL SPECIFIC ADDRESS | |
|---|---|---|
| | HEADER TYPE | ADDRESS IN HEADER |
| XXXX1/1 | UDP HEADER | CMIP PORT |
| XXXX1/2 | IPX HEADER | CMIP SOCKET |
| XXXX1/3 | DDP HEADER | CMIP SOCKET/NAME |
| XXXX2/1 | UDP HEADER | PORT 160/161 |
| XXXX2/2 | IPX HEADER | SOCKET 900F/9010 |
| XXXX2/3 | DDP HEADER | SOCKET 8/9 - SNMP AGENT/SNMP TRAP HANDLER |
| 901 | 903 | 904 |

FIG. 9B

| ACCESS ID/ACCESS LINE | PROTOCOL SPECIFIC ADDRESS | |
|---|---|---|
| | HEADER TYPE | ADDRESS IN HEADER |
| YYYY1/1 | DDP HEADER | SOCKET 8/9 - SNMP AGENT/SNMP TRAP HANDLER |
| YYYY1/2 | UDP HEADER | PORT 160/161 |
| YYYY1/3 | IPX HEADER | SOCKET 900F/9010 |
| YYYY2/1 | DDP HEADER | CMIP SOCKET/NAME |
| YYYY2/2 | UDP HEADER | CMIP PORT |
| YYYY2/3 | IPX HEADER | CMIP SOCKET |

ADAPTIVE NETWORK PROTOCOL INDEPENDENT INTERFACE

BACKGROUND OF THE INVENTION

1. Field of the Invention

The present invention relates to a method of transmitting data between application programs executing on different devices interfaced to a local area network and, more particularly, to a method of transmitting data between application programs independent of any specific protocol.

2. Description of the Related Art

Computerized local area networks (LAN's) are in widespread use for interconnecting many different computers and peripherals so as to allow users of the computers to communicate with one another and also to allow those users shared access to the peripherals. Recent developments in LAN's have seen the introduction of so-called "heterogeneous" LAN's, i.e., LAN's on which many different communication protocols are carried on a single Ethernet or Token-ring medium. Examples of different protocols are IPX, which is typically used by DOS-based PC's, UDP/IP, which is typically used by UNIX-based workstations, and DDP, which is typically used by Macintosh computers. Each type of computer or workstation can be adapted through software to communicate using multiple different protocols.

A peripheral also can include software, i.e., multiple protocol stack modules, which allows the peripheral to communicate using multiple protocols in order to be shared on a heterogeneous LAN. A protocol stack is a software module that processes packets of data which are received from or are transmitted to the LAN using the corresponding protocol. The protocol stacks and the associated lower-level software for network communications are typically stored and executed on a network interface device which may be embedded in or attached to the peripheral. The network interface device serves as an interface which allows the peripheral to communicate with other network devices via the LAN.

Network devices, i.e., network interface devices and computers which are interfaced to the LAN, also execute application programs. These programs execute at a level above the protocol stacks and can include, for example, print server programs, management programs which allow communication between a computer and a peripheral in order to configure or obtain status data from the peripheral, and other programs which may communicate data between different devices interfaced to the LAN. Exemplary management programs include programs that implement SNMP (Simple Network Management Protocol) and CMIP (Common Management Information Protocol). More than one such management program may be executing on a single network device at the same time.

In a conventional approach, an application program communicates with a protocol stack via an application programming interface (API) and uses the protocol stack to perform communications services. An application program must use different APIs to interface with each different protocol stack. This means that the application program must be aware of the particular network environment, i.e., the protocol in use, and the specific network API to be used.

The conventional approach leads to many difficulties. If an application program must support multiple network protocols, duplicated effort is required for the application software to handle the different APIs. For example, an SNMP program must include software code to communicate with an IPX protocol stack and a DDP protocol stack, in addition to code to communicate with a UDP protocol stack. Moreover, a CMIP program or any other application will also require the extra code for communicating with different protocol stacks. As a result, application programs that are designed to support multiple protocols using the conventional approach require a more complex design, have a longer development time, have less portability, and have a higher maintenance cost than application programs which support a single protocol.

Accordingly, a way is needed for application programs to communicate with application programs on other network devices independent of a specific protocol.

SUMMARY OF THE INVENTION

The above need is addressed by the present invention in which data is transmitted between application programs executing on different devices independent of a specific protocol.

In a first aspect, the present invention is a protocol independent method of transmitting a data packet from a first application program executing on a first device which is interfaced to a LAN and a second application program executing on a second device which is interfaced to the LAN. A protocol independent interface (PII) program is initialized which determines which protocols are available for use, assigns an access line to each protocol available for use, assigns an access ID to the first application program, and creates mapping information that indicates a one-to-one correspondence between an access ID/access line pair and a block of protocol specific information which includes a protocol header having predetermined address data. A data packet is sent to the PII program together with the access ID of the first application program and a destination ID for the second application program, and one of the available protocols is selected to transmit the data packet. A block of protocol specific information is retrieved from the mapping information based on the access ID of the first application program and the access line corresponding to the selected protocol, and a transmission packet is formed which includes the data packet, the destination ID, and the retrieved block of protocol specific information. The transmission packet is then transmitted via the LAN.

By virtue of this arrangement, a generic interface is provided between application programs and protocol stacks, so that the protocol used to transmit data between application programs executing on different network devices is transparent, i.e., unknown to the application program. As a result, application programs can be written generally without including code to handle communication with different application programming interfaces for different protocol stacks.

In another aspect, the present invention is a method of delivering a data packet received from a first application program executing on a first device which is interfaced to a local area network (LAN) to a second application program executing on a second device which is interfaced to the LAN. A protocol independent data packet is received from the first application program, together with data identifying the first application program and a destination ID identifying the second application program. The protocols available for use are determined and one of the available protocols is selected to transmit the data packet. Protocol specific information which includes a protocol header having predetermined address data is determined based on the data identifying the first application program and the protocol selected in said selecting step. A transmission packet is then formed which includes the data packet, the destination ID, and the determined protocol specific information, and the transmission packet is transmitted to the second application program via the LAN.

By virtue of this arrangement, a data packet which is received from one application program without any data specifying a protocol can be transmitted to another application program based only on information identifying the source and destination programs received from the one application program.

In yet another aspect, the present invention is a method of receiving data which is transmitted from a first application program executing on a first device which is interfaced to a local area network (LAN) to a second application program executing on a second device which is interfaced to the LAN. A protocol independent interface program is initialized which (i) determines which protocols are available for use, (ii) assigns an access line to each protocol available for use, (iii) assigns a unique access ID to the second application program, and (iv) creates mapping information that indicates a one-to-one correspondence between an access ID/access line pair and a block of protocol specific information which includes a protocol header having predetermined address data. A transmission packet is received from the LAN which includes data and a block of protocol Specific information including a protocol header having predetermined address data. The access ID/access line pair which corresponds to the block of protocol specific information contained in the received transmission packet is then retrieved from the mapping information, and the data contained in the received transmission packet is sent to the second application program based on the access ID retrieved from the mapping information.

By virtue of this arrangement, a received packet can be routed to the correct application program through a generic interface without the need for an application programming interface specific to a particular protocol and application program.

In still another aspect, the present invention is a network device which is interfaced to a local area network (LAN) and which transmits data from a first application program executing on said network device to a second application program executing on another device interfaced to the LAN. The network device includes a LAN interface for sending data to and receiving data from the LAN and a storage device which stores the first application program and a protocol independent interface program which (i) determines which protocols are available, (ii) assigns an access line to each available protocol, (iii) assigns an access ID to the first application program, and (iv) creates mapping information having a one-to-one correspondence between an access ID/access line pair and a block of protocol specific information which includes a protocol header having predetermined address data. The network device also includes a processor which (i) executes the first application program, (ii) initializes the protocol independent interface program, (iii) processes a data packet which is generated by the first application program by selecting a protocol to transmit the data packet, retrieving a block of protocol specific information from the mapping information based on the access line corresponding to the selected protocol and the access ID of the first application program, and forming a transmission packet including a destination ID for the second application, the data packet, and the retrieved block of protocol specific information, and (iv) transmits the transmission packet via the LAN.

By virtue of this arrangement, a network device can transmit data from an application program which it executes to an application program executing on another device in such a manner that the protocol used to transmit the data is transparent to the application programs.

According to still a further aspect, the present invention is a network device which is interfaced to a local area network (LAN) and which receives data that is transmitted from a first application program executing on another device interfaced to the LAN to a second application program executing on said network device. The network device includes a LAN interface for sending data to and receiving data from the LAN and a storage device which stores the second application program and a protocol independent interface program which (i) determines which protocols are available, (ii) assigns an access line to each available protocol, (iii) assigns an access ID to the second application program, and (iv) creates mapping information having a one-to-one correspondence between an access ID/access line pair and a block of protocol specific information which includes a protocol header having predetermined address data. The network device also includes a processor which (i) executes the second application program, (ii) initializes the protocol independent interface program, (iii) receives via said LAN interface a data packet which is transmitted by the first application program and which includes a block of protocol specific information, (iv) retrieves an access ID/access line pair from the mapping information which corresponds to the block of protocol specific information contained in the data packet, and (v) sends the data packet to the second application program based on the access ID retrieved from the mapping information.

By virtue of this arrangement, a network device can receive data from an application program and route the data to a destination application program in such a way that the protocol used to transmit the data is transparent to the application program receiving the data. As a result, an application programming interface that is specific to the protocol and the application program is not needed to receive data.

BRIEF DESCRIPTION OF THE DRAWINGS

FIGS. 7A and 7B show examples of protocol mapping tables created by protocol independent interfaces.

FIGS. 8A and 8B show examples of access ID mapping tables created by protocol independent interfaces.

FIGS. 9A and 9B show examples of protocol address mapping tables created by protocol independent interfaces.

DESCRIPTION OF THE PREFERRED EMBODIMENT

[1. System Overview]

Figure 1:
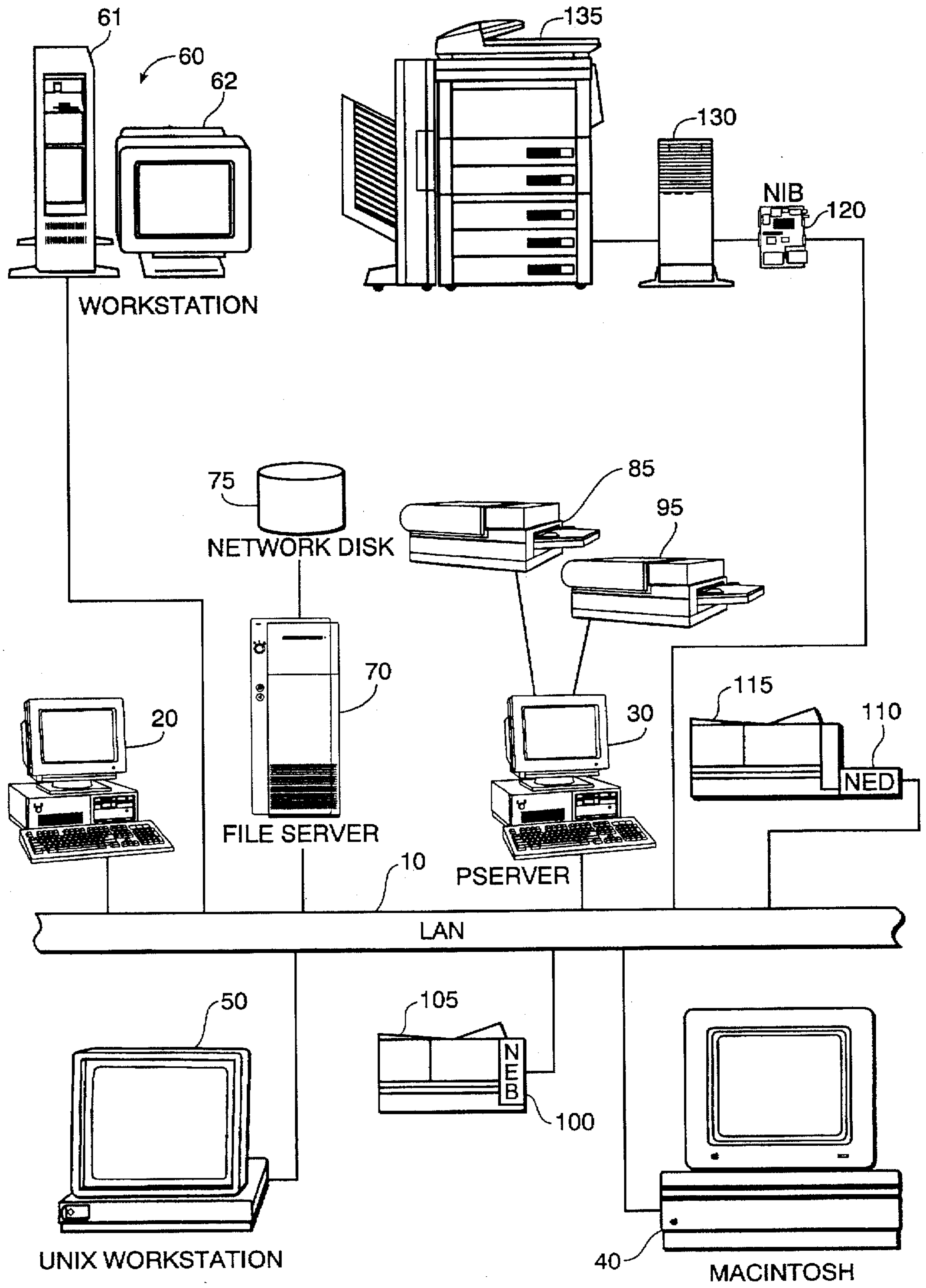
FIG. 1 is a diagram of a local area network.

FIG. 1 is an illustration of a heterogeneous network system including several different types of computers and several different peripherals to which the computers can share access. The present invention can also be used with devices connected to a homogenous network, i.e., a network in which every device uses the same protocol.

In FIG. 1, LAN 10 is depicted as an Ethernet medium which has a bus-type architecture, but a Token-ring medium having a ring-type architecture can be used as well. Connected to LAN 10 are a PC 20 which serves as a system administrator's computer, a PC 30 which serves as a print server for printers 85 and 95, a Macintosh computer 40, a UNIX workstation 50, and a generalized workstation 60 having a control unit 61 and a display 62. A fileserver 70 allows shared access to a network disk 75. A network expansion board (NEB) 100 allows shared access to a printer 105, and a network expansion device (NED) 110 allows shared access to a printer 115. In addition, a network interface board (NIB) 120 allows shared access to a copier 135 via a multiple device controller (MDC) 130.

The present invention relates to communication between application programs executing on different network devices. A preferred form of the present invention is described below in the context of communication between PC 20 and NEB 100. However, the present invention is applicable to computers and embedded network devices in general. Accordingly, the present invention can be applied to communication between other computers such as Macintosh computer 40, UNIX workstation 50, generalized workstation 60 and other network interface devices such as NED 110 (an example of which is described in copending U.S. patent application Ser. No. 08/489,116 filed on Jun. 9, 1995, and entitled "Outputting a Network Device Log File") and NIB 120 (an example of which is described in U.S. patent application Ser. No. 08/409,034, filed on Mar. 23, 1995, and entitled "Network Interface Board For Digital Copier", which is assigned to the assignee of the present invention).

The present invention also can be applied to communication between application programs executing on different computers that have the capacity to use multiple protocols. Moreover, the present invention is not limited to network applications, but instead can be used for devices having a direct connection through any bidirectional interface, e.g., a shared memory, a SCSI interface, an RS-1284 parallel interface, or the like.

[2. Software Architecture]

Figure 2:
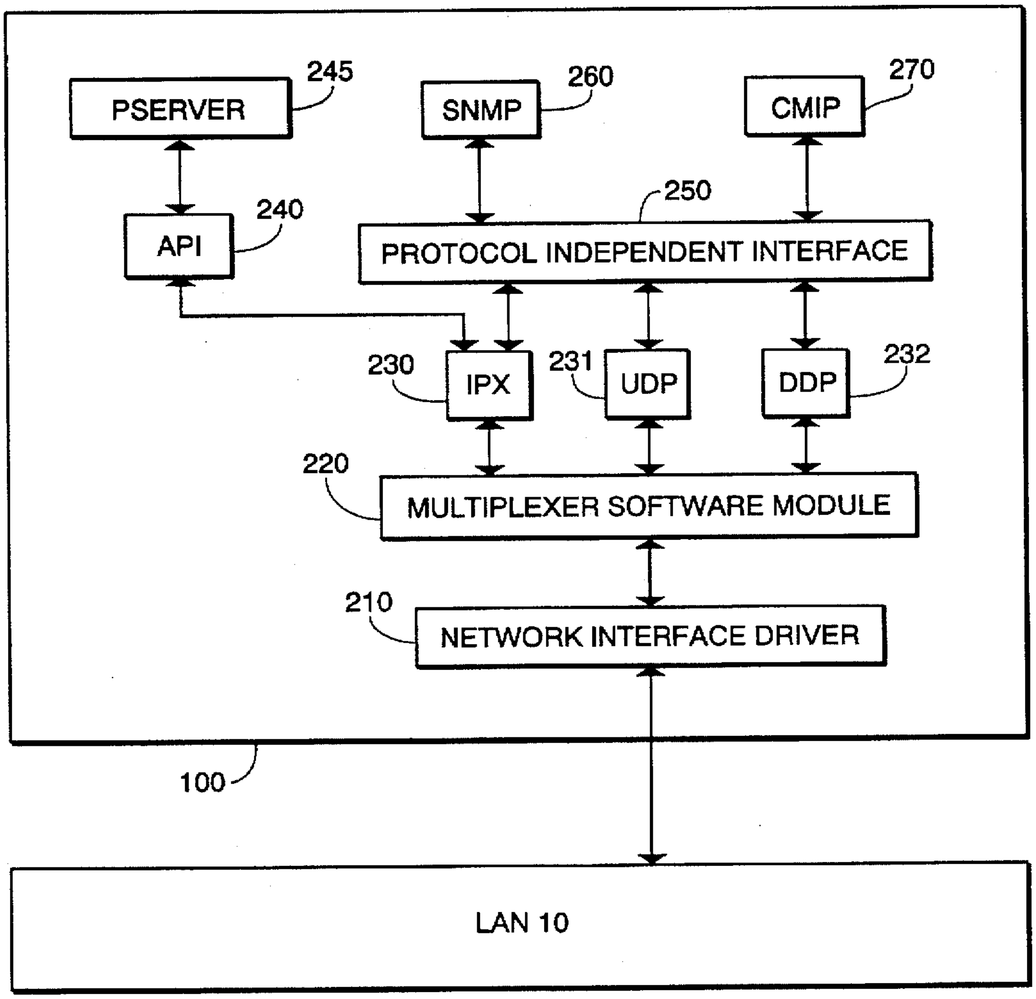
FIG. 2 is a diagram showing the software architecture used for communication between application programs according to the preferred embodiment of the present invention.

FIG. 2 shows the software architecture of program modules executing on a network device such as NEB 100. Similar software executes on a computer such as PC 20. A network interface driver 210 is the lowest level of software which interfaces with LAN 10 and handles sending and receiving of packets on LAN 10 by adding or stripping off packet frame headers. Network interface driver 210 includes a media-type specific component which is designed for either an Ethernet or a Token-ring network medium and includes a plurality of logical boards for respectively processing packets having different frame types. A multiplexer software module 220 serves as a multiplexer which routes packets between network interface driver 210 and one or more protocol stacks. Each protocol stack receives packets that use the corresponding protocol, determines what needs to be done with the packets, and routes the packets to the appropriate application programs for servicing. The preferred embodiment supports three protocol stacks: IPX stack 230, UDP stack 231, and DDP stack 232. All of the protocol stacks might not be loaded on a particular device. Further, additional stacks for other protocols may be included. In the preferred embodiment, network interface driver 210, multiplexer software module 220, and protocol stacks 230–232 conform to the Open Data-Link Interface (ODI) specification described in "Open Data-Link Interface Developer's Guide for DOS Workstation Protocol Stacks", Version 1.10, Released by Novell, Inc., Mar. 18, 1992.

A protocol independent interface (PII) 250 serves as an interface between protocol stacks 230–232 and management application programs such as an SNMP application program 260 and a CMIP application program 270. PII 250 "listens" for data packets addressed to particular sockets, i.e., addresses, and accepts those packets from the protocol stacks 230–232 for processing and forwarding to the application programs. Since SNMP program 260 and CMIP program 270 are executing on an embedded device, i.e., NEB 100, those programs are "agent" programs. An agent program collects and stores data regarding the network interface device, i.e., NEB 100, and the peripheral, i.e., printer 105, and responds to commands sent using the associated network management protocol, e.g., SNMP or CMIP, from a related "manager" program executing on a computer.

For example, the following predetermined addresses are used in the preferred embodiment for receiving data packets using the SNMP network management protocol: (1) for IPX, "socket" $900F_H$ and $9010_H$ (agent socket and trap socket, respectively), (2) for UDP, "port" $160_H$ and $161_H$, and (3) for DDP, a unique name "SNMP Agent" and "SNMP Trap Handler" and "socket" $8_H$ and $9_H$ (agent socket and trap socket, respectively). Data packets that are not addressed to a socket used by a management program are routed to other application programs. For example, a PSERVER program 245 receives data packets via an API 240. Other application programs, including other management programs, can also be included.

Figure 3:
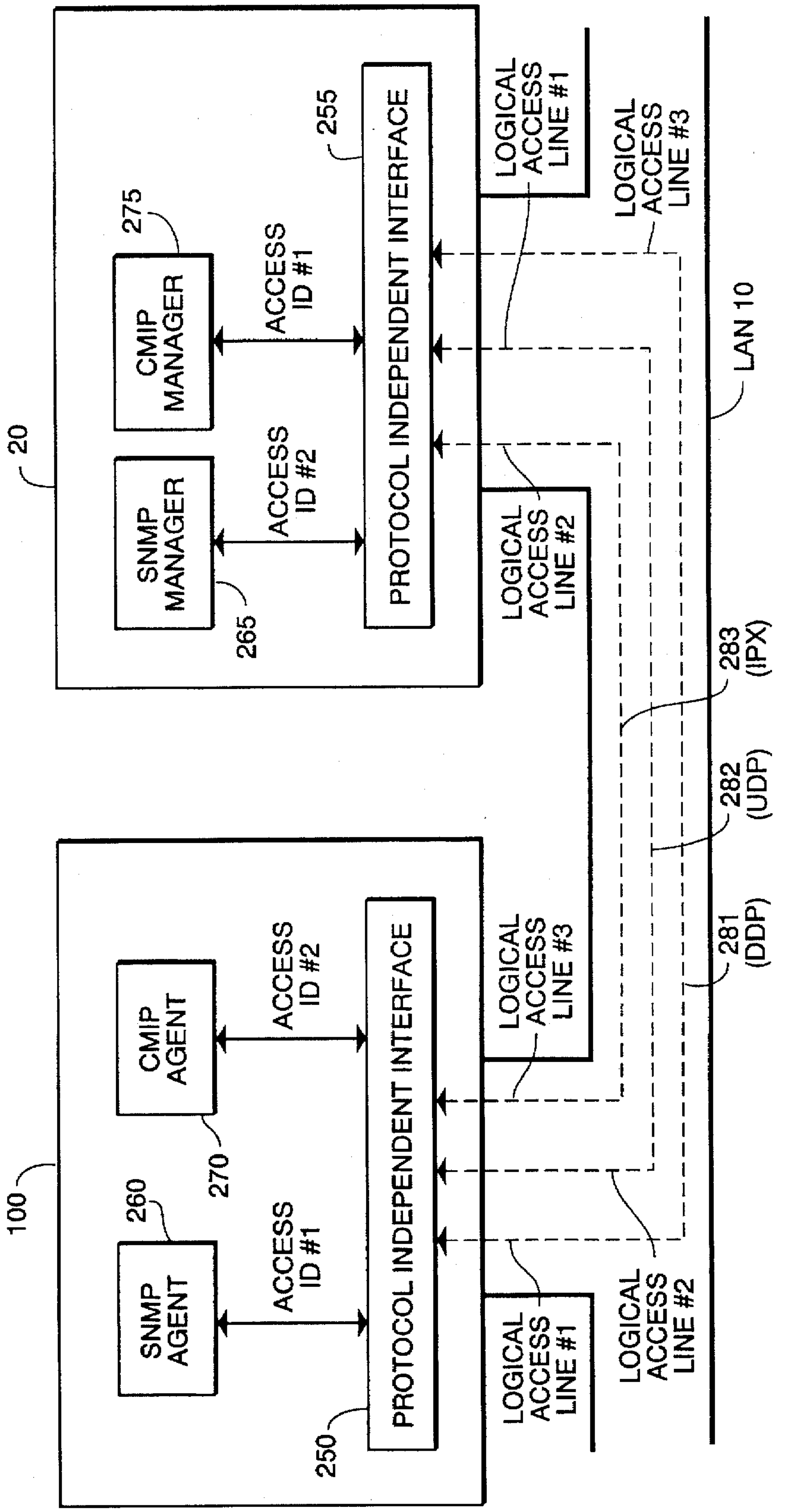
FIG. 3 is a diagram showing the functional relationships between software modules executing on a computer and a network interface device.

FIG. 3 is a diagram showing the functional relationship between manager programs executing on PC 20 and agent programs executing on NEB 100. As shown in FIG. 3, PC 20 includes a protocol independent interface (PII) 255, an SNMP manager 265, and a CMIP manager 275. During an initialization process described below, PII 255 assigns a unique identifier referred to as an access ID to each management program. The access ID may be, for example, the MAC address of the device together with an additional number to uniquely identify each of SNMP manager 265 and CMIP manager 265. Reference numerals 281, 282, and 283 designate logical channels used by different respective protocols, such as IPX, UDP, and/or DDP. PII 255 assigns an identifier referred to as a "logical access line" to each of the protocols, i.e., logical channels 281–283, during initialization. By dynamically assigning access IDs and logical access lines, the PII can be readily adapted to support later-developed protocols without affecting the existing functionality.

PII 250 in NEB 100 likewise assigns an access ID to each of SNMP agent 260 and CMIP agent 270 and assigns a logical access line to each of the protocols. However, since the access IDs and logical access lines are specific to the PII that assigns them, the access IDs and logical access lines assigned by PII 250 in NEB 100 can differ from those assigned by PII 255 in PC 20. For example, as shown in FIG. 3, SNMP manager 265 has access ID #2 in PC 20, but the corresponding agent in NEB 100, i.e., SNMP agent 260, has access ID #1. Similarly, as shown in FIG. 3, PII 250 assigns logical access line #1 to logical channel 281, which may correspond to an IPX protocol, for example, while PII 255 assigns logical access line #3 to the same logical channel/ protocol.

PII 250 and PII 255 perform identical interface functions. However, there are some differences in implementation due to the different platforms on which these software modules execute. For example, since PII 250 executes on an embedded device, it is implemented as a TSR (terminate and stay resident) routine. On the other hand, SNMP manager 265 is a Windows based application and PII 255 is implemented as a Windows-based DLL (Dynamic Link Library). Other differences are indicated in the description below where appropriate.

[3. NEB Architecture]

Figure 4:
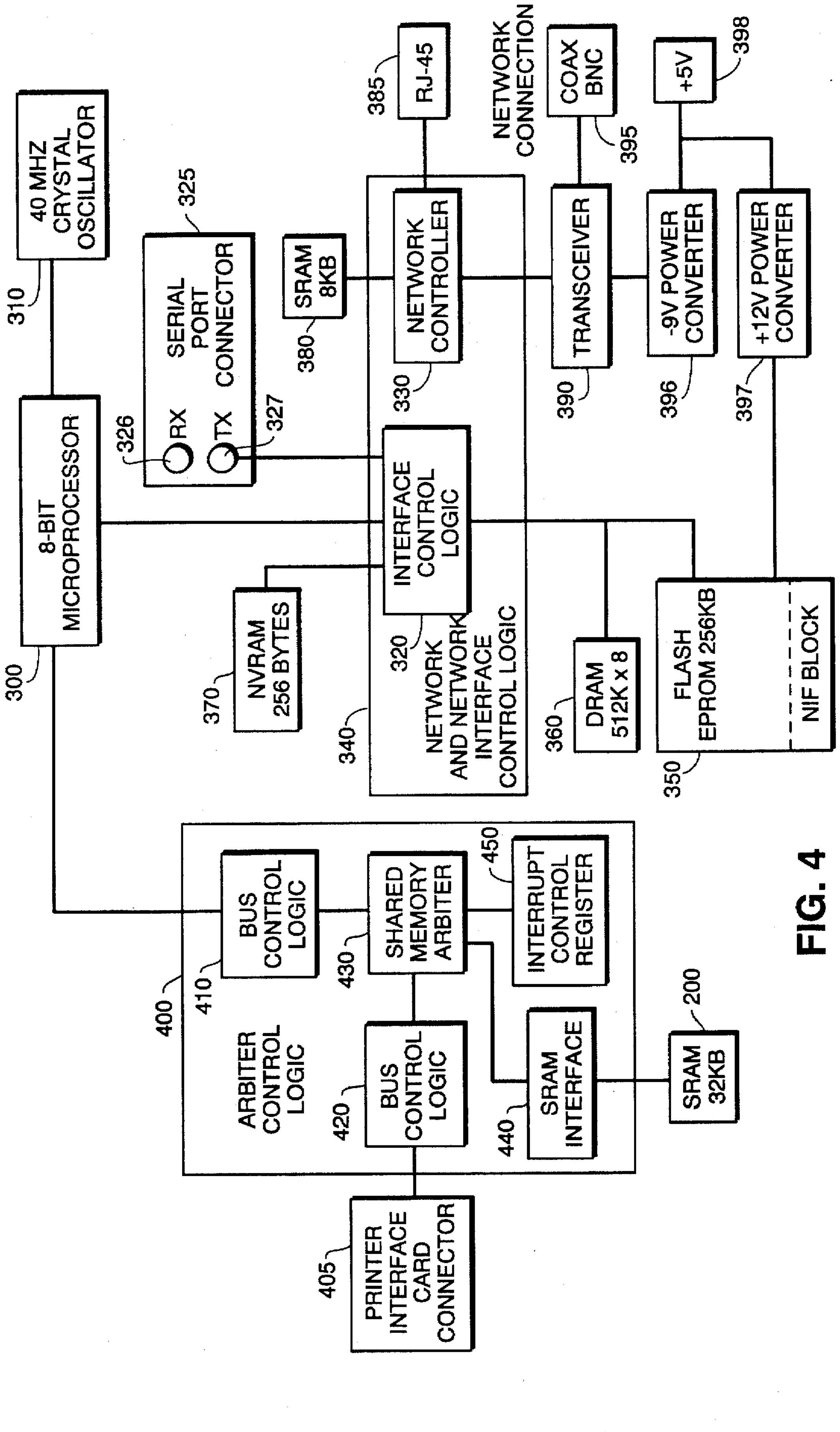
FIG. 4 is a functional block diagram of a network expansion board for interfacing a printer to a local area network.

FIG. 4 is a functional block diagram of NEB 100. Broadly speaking, NEB 100 is an interactive network circuit board which couples printer 105 to LAN 10, making printer 105 a responsive and interactive network member. NEB 100 includes a shared memory SRAM 200 which is used for bidirectional communications between NEB 100 and printer 105. Printer 105 includes a printer interface card 220 (not shown) having a microprocessor 225 (not shown) that reads data from and writes data to SRAM 200. Printer 105 also includes a printer engine 250 (not shown) connected to printer interface card 220.

NEB 100 receives print data, status requests, and control commands from LAN 10, transmits print data, status requests, and control commands to printer 105 for execution, and transmits status information back to LAN 10. Thus, NEB 100 can perform not only RPRINTER remote printer services and PSERVER print server functionalities, but can also offer to network members whatever status and control features are available from the peripheral interface.

Power for all circuits is supplied to NEB 100 from a +5 V power source 398. Power is provided from power source 398 to power converter 396 which provides −9 V power to a transceiver 390 and to power converter 397 which provides +12 V power to a flash EPROM 350 for "flashing" (i.e., reprogramming of the EPROM). Network and network interface control logic 340 is preferably a single 144-pin application specific integrated circuit (ASIC) that includes a network controller 330 and interface control logic 320. Network controller 330 is an NCR macro-cell compatible with a National DP83902A "ST-NIC" Ethernet controller, the details of which can be found in National Semiconductor's *Local Area Networks Databook*, National Semiconductor p/n 400055, National Semiconductor, 1993. Network controller 330 is designed to interface with CSMA/CA-type (carrier sense multiple access with collision detection) local area networks.

Network controller 330 connects with RJ-45 connector 385 directly and with coaxial connector 395 through transceiver 390, which is preferably a National Semiconductor DP8392 coaxial transceiver interface, the details of which can also be found in National's *Local Area Networks Databook*. Network controller 330 is also coupled to an 8 KB SRAM 380 that is used as an input/output packet buffer for Ethernet data. This memory should preferably have an access time of about 70 ns or less.

Interface control logic 320 provides an interface between network controller 330, microprocessor 300, and memory devices EPROM 350 and DRAM 360. Interface control logic 320 also interfaces with non-volatile random access memory (NVRAM) 370, which is a 256 byte serial electrically erasable/programmable memory used for initialization data storage during power cycling of printer 105. Network and printer configuration parameters are written into NVRAM 370 when printer 105 is first installed onto the network to allow NEB software to recover the installation parameters after printer power has been cycled off and on.

Interface control logic 320 also couples with serial port connector 325, which comprises a receive data pin 326 and a transmit data pin 327 that can respectively receive and transmit serial data streams for debugging purposes. Interface control logic 320 senses data present at the receive data line and samples the serial bits at regular intervals.

The central controller of NEB 100 is microprocessor 300, which is preferably an Intel 80C188EA-20 8-bit processor, the details of which can be found in the 80C186EA/ 80188EA User's Manual, Intel p/n 270950-001, Intel Corp. This processor is an 8-bit processor with direct memory access (DMA), interrupts, timers, and a DRAM refresh control. Other microprocessors, such as an AMD 80C188-20 8-bit microprocessor, might alternatively be used. 256 KB flash EPROM 350 and 512 KB DRAM 360 are coupled to microprocessor 300 via interface control logic 320, while 32 KB SRAM 200 (which is shared with printer interface card 220) is coupled with microprocessor 300 via arbiter control logic 400. A 40 MHz, 50 ppm crystal oscillator 310 provides microprocessor 300 with a clock signal that is wholly separate from and asynchronous with the clock signal provided to microprocessor 225 on printer interface card 220.

Microprocessor 300 executes instructions in flash EPROM 350, which stores control firmware and printing application software. After power-on self-test (POST), code from EPROM 350 is selectively moved to the higher performance 512 KB DRAM 360, which should preferably have an access time of about 80 ns, for actual execution.

All communication between NEB 100 and printer interface card 220 is executed via 32 KB shared SRAM 200. Arbiter control logic 400, preferably a single 100-pin ASIC, arbitrates between the two-byte-wide memory accesses of printer interface microprocessor 225 and the single-byte-wide memory accesses of NEB microprocessor 300, each of which is completely independent of the other.

Generally speaking, the 8-bit data bus of microprocessor 300 on board NEB 100 communicates with bus control logic 410, while the 32-bit data bus of microprocessor 225 on board printer interface card 220 communicates with bus control logic 420. Memory accesses from each bus are routed to shared memory arbiter 430, which determines which bus has priority and permits the bus with priority to access SRAM 200 via SRAM interface 440. Interrupt control register 450 is also accessed through shared memory arbiter 430, to allow one microprocessor to interrupt the other.

All software modules executed by microprocessor 300 are stored in flash EPROM 350. Those modules that are needed are selectively loaded from EPROM 350 into DRAM 360 and are executed from DRAM. This permits flexible configuration of NEB 100 by selection of which modules are to be loaded.

Figure 5:
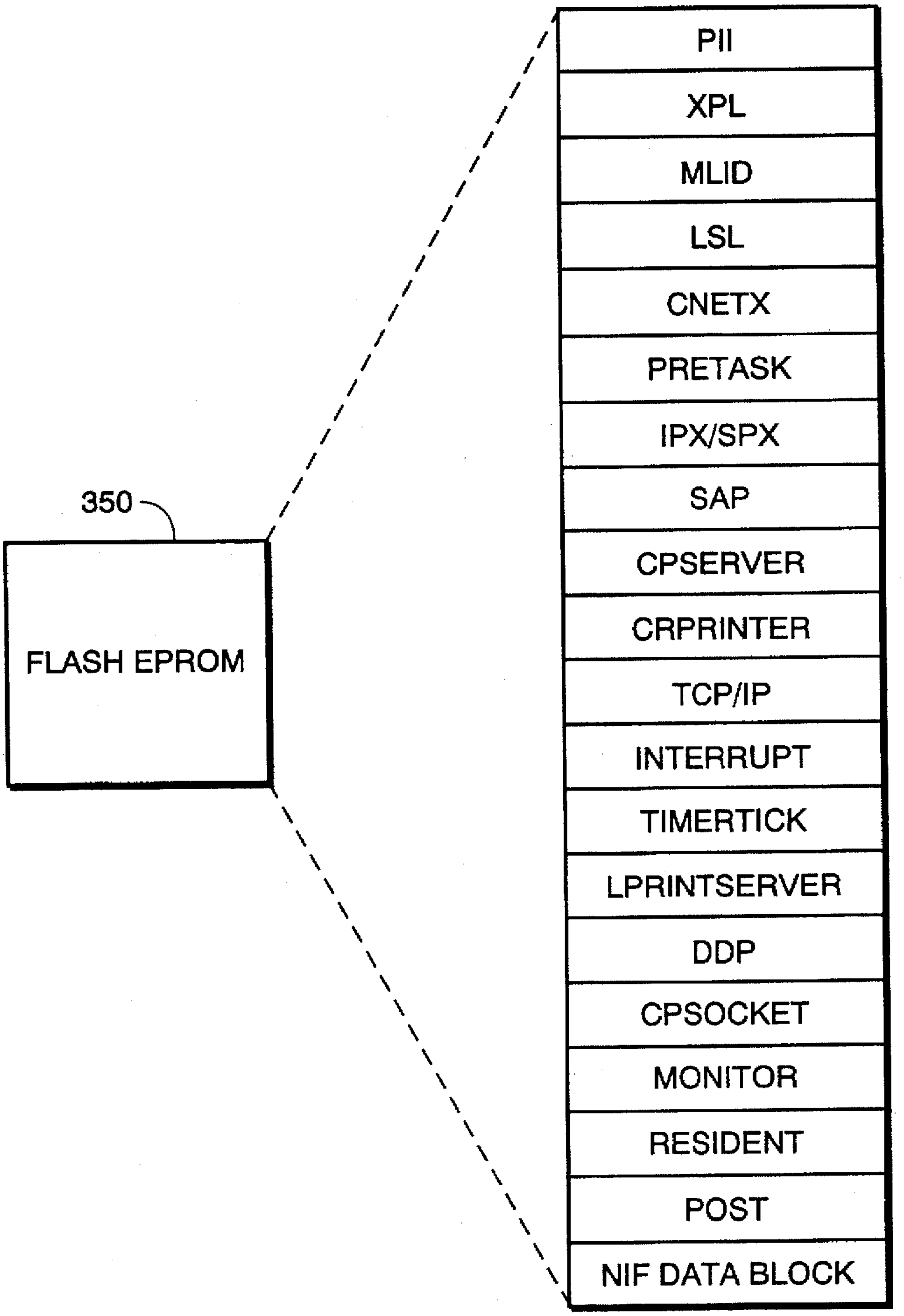
FIG. 5 illustrates software modules that may be stored in memory on the network expansion board.

FIG. 5 illustrates an example of blocks of code, or software modules, that are stored in flash EPROM 350. The PII module contains process steps for providing the required functions of a protocol independent interface, as described in more detail below. The XPL module provides a standardized interface between printer 105 and NEB 100. MLID (Multi Link Interface Driver) serves as network interface driver 210 and is a piece of Novell code (Media Support Module, or MSM) linked together with a piece of customized code (Hardware Support Module, or HSM) that is the lowest level of network connection, while LSL (Link Support Layer) serves as multiplexer software module 220 and is a piece of Novell code that acts as a multiplexer between the low level MLID and the several protocol stacks above it. CNETX is customized code that turns local DOS-like function calls into network function calls, providing file functions like OPEN, READ, WRITE, and CLOSE.

The PRETASK module is responsible for identifying what frame types are associated with the various possible protocol stacks. Because NEB 100 supports multiple protocol stacks, this module exists as long as NEB 100 is running.

Novell's IPX/SPX protocol stack is contained in flash EPROM 350, and is supported by SAP, or Service Advertising Protocol. SAP is a Novell concept that allows devices to register themselves into the file server's bindery, which lists active and inactive network entities. Because print servers are a special kind of bindery item, SAP registers NEB 100 via CPSOCKET, and if NEB 100 is configured as a print server, SAP also registers the print server with the NetWare bindery.

CPSERVER is a custom implementation of a Novell print server application. This module provides self-generated print banners, user notification of completion and exception status, and transmission of print data and status commands to the printer. This differs from the Novell print server in that CPSERVER is dedicated to driving the local printer (i.e., printer 105 in which NEB 100 is installed) and cannot drive any remote RPRINTERs. This program owns the print data lines for the duration of a print job. CRPRINTER is a custom implementation of a Novell RPRINTER print application. This module is a slave application that is sent data by a Novell print server application elsewhere on LAN 10.

The TCP/IP protocol stack has User Datagram Protocol (UDP), Reverse Address Resolution Protocol (RARP) and BootP support within. INTERRUPT is the interrupt handler for the TCP/IP task, while TIMERTICK is the timer tick for UNIX TCP/IP network tasks. LPRINTSERVER is the TCP/IP print server application, and also owns the print data lines for the duration of a print job. DDP is the module for implementing a Datagram Delivery Protocol (DDP) which is used, for example, for communications with a Macintosh computer.

The CPSOCKET program runs for all protocol stacks. The program responds to requests for connection, requests for data download, or requests for services from remote utilities, and provides status and control to other tasks via interprocess communication. Because CPSOCKET typically owns the status and control lines between NEB 100 and printer 105, it is the only task that has the ability to obtain printer status via the status lines. CPSOCKET is responsible for the network connection and packet contents between the Novell-oriented status and control utilities (CPNET or the corresponding Windows version of client-based software utilities), or between the UNIX-oriented status and control utilities (CPUTIL).

MONITOR is a customized multi-tasking monitor which performs task creation, task destruction and microprocessor dispatch. MONITOR also has memory management submodules MEMGET and MEMFREE. RESIDENT is a block of routines that provides generic services such as read and write to flash EPROM 350, FLASH code, ROM based debugger, hardware timer tick and other basic features. POST is a power-on self-test module that checks the integrity of NEB hardware and software at power-up.

Also stored in EPROM 350 is a network identification file (NIF) data block which stores board-invariant information, which is unique for every network board, hardware configuration data, board revision number and the like, as well as changeable information such as software version number. The information in the NIP data block is used to ensure that flash EPROM 350 is not reprogrammed with an incompatible firmware image.

Specifically, EPROM 350 stores "board" information such as model number, firmware level, and board revision number, as well as "network" information such as Media Access Control (MAC) address, which is unique for every network board, board name, network frame type, primary file server identification, queues serviced, network protocol, sampling frequency, PSERVER name, zone-name, and the like.

[4. Function of PII]

Figure 6:
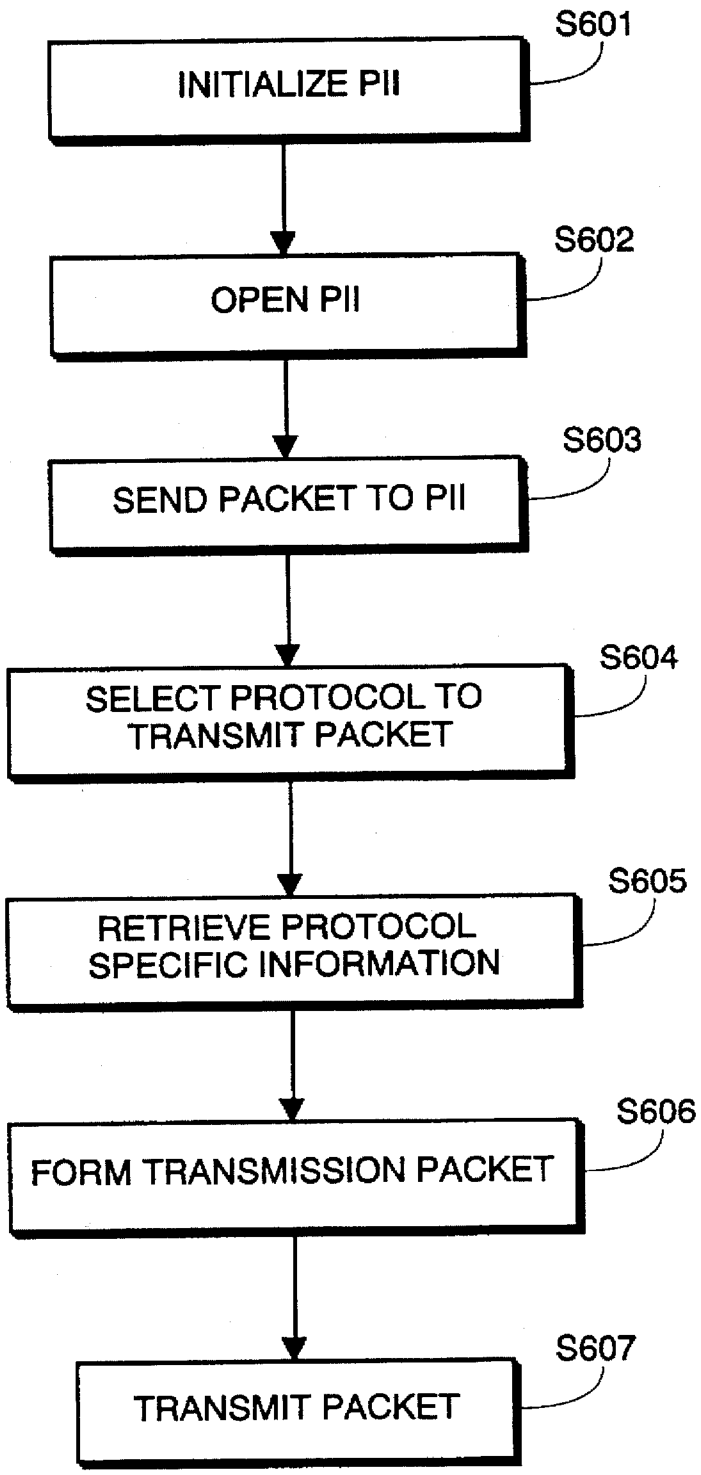
FIG. 6 is a flow diagram showing process steps for transmitting a data packet between a first application program executing on a first network device and a second application program executing on a second network device.

FIG. 6 is a flow diagram showing process steps for implementing a protocol independent method of transmitting a data packet from a first application program executing on a first device which is interfaced to a LAN to a second application program executing on a second device which is interfaced to the LAN. Briefly, according to FIG. 6, a protocol independent interface (PII) program is initialized which determines which protocols are available for use, assigns an access line to each protocol that is available for use, assigns an access ID to the first application program, and creates mapping information that indicates a one-to-one correspondence between an access ID/access line pair and a block of protocol specific information which includes a protocol header having predetermined address data. This one-to-one mapping can be done by using a mapping table, as in the preferred form described below, or by implementing a data structure that carries the mapping information. A data packet is sent to the PII program together with the access ID of the first application program and a destination ID for the second application program, and one of the available protocols is selected to transmit the data packet. A block of protocol specific information is retrieved from the mapping table based on the access ID of the first application program and the access line corresponding to the selected protocol, and a transmission packet is formed which includes the data packet, the destination ID, and the retrieved block of protocol specific information. The transmission packet is then transmitted via the LAN.

More specifically, the process steps of FIG. 6 show transmission of a data packet from SNMP manager 265 on PC 20 to SNMP agent 260 on NEB 100. The function of PII 250 to transmit a data packet from SNMP agent 260 to SNMP manager 265 is the same, with the only differences being the differences in implementation discussed herein. In step S601, SNMP manager 265 executes an initialization command to initialize PII 255. This command must be executed prior to execution of any other PII commands and need only be performed once. As mentioned above, PII 255 is implemented in Windows as a DLL. Accordingly, in response to the initialization command, the necessary operations are performed to enable SNMP manager 265 to execute other PII commands using the DLL. In contrast, initialization of PII 250 by SNMP agent 260 in NEB 100 returns a table of entry points that SNMP agent 260 uses to call other PII routines.

PII 255 then determines which protocols are available for use by PC 20. In the preferred embodiment, where PC 20 is operating in a Windows or DOS Novell-ODI environment, function calls which obtain an indication of the presence or absence of each protocol stack are issued in a round-robin manner to determine which protocol stacks are available. Alternatively, commands to execute respective initialization routines for each protocol stack can be issued in round-robin fashion. If an initialization routine fails, the failure is interpreted to indicate that the protocol stack is not available at that instant. In the embedded platform, i.e., for PII 250 on NEB 100, the pretask module has information regarding the available protocol stacks and that information is obtained and used by PII 250.

After determining which protocols are available, PII 255 opens a socket for each available protocol depending on the type of protocol, and sets up a protocol mapping table. This table has a one-to-one correspondence between an access line and a type of protocol stack. As noted above, the mapping table is one of many possible implementations. For example, the protocol mapping also can be implemented as a bit map or some other data structure. The key is that there is a way of indicating a one-to-one correspondence between the access line and protocol stack. The mapping table used in the preferred embodiment is formed by assigning an access line to each available protocol and storing data indicating the access line assigned to each protocol in a section of memory reserved for use by PII 255. FIG. 7A is an example of a protocol mapping table that may be created by PII 255 when UDP, IPX, and DDP protocols are available, using the exemplary access line assignments shown in FIG. 3.

After initialization of PII 255 in step S601, flow proceeds to step S602 in which an Open command is executed by SNMP manager 265 to open a session. This command returns an access ID for a management program to use to identify itself, e.g., access ID #2 for SNMP manager 265. PII 255 stores data indicating the relationship between access IDs and management programs in the section of memory reserved for use by PII 255. FIG. 8A is an example of an access ID mapping table set up by PII 255 to indicate the relationship between access IDs and management programs. As with the protocol mapping table discussed above, the mapping between access IDs and application programs is capable of many implementations other than a mapping table, e.g., a bit map or other data structure. The data in FIG. 8A corresponds to the exemplary assignment of access IDs shown in FIG. 3. The access IDs are shown as XXXX1 or XXXX2, where XXXX represents the MAC address of PC 20 and the 1 and 2 indicate CMIP manager 275 and SNMP manager 265, respectively. The purpose of an access ID is to uniquely identify different entities that utilize the PII, for example, CMIP manager 275 and SNMP manager 265.

Flow next advances to step S603 in which a data packet is sent to PII 255 from SNMP manager 265. The packet is sent by providing a pointer to the packet's location in memory, together with the access ID for SNMP manager 265 and a destination ID for the packer's destination. Since no information indicating a transmission protocol is required for the packet, the packet is protocol independent and a single interface is provided between an application program and all protocol stacks. The destination ID of the corresponding agent, e.g., SNMP agent 260 corresponding to SNMP manager 265, is determined in the preferred embodiment by performing a locate_agent function before data is sent to an agent. For example, in the case where Novell Netware is used, this function is performed by looking in a bindery in fileserver 70 to determine devices which are registered in the bindery, e.g., by using IPX's SAP function, and which may have compatible agents. Communication with those devices then takes place to obtain a destination ID for the agent. In a UNIX environment, the locate_agent function is performed by using predetermined host tables. In an AppleTalk environment, an agent is located using a unique name. Any other technique can also be used which allows the manager program to obtain a destination ID for an agent program.

After the packet is sent to PII 255, flow proceeds to step S604 in which a protocol is selected to transmit the data packet. If only one protocol is available, that protocol will be used. In the preferred embodiment, a protocol is selected by using a default or preferred protocol, if available. For example, UDP is the preferred protocol for transmitting data between SNMP manager 265 and SNMP agent 260. If the preferred protocol is not available, then the first available protocol is used. However, there are many alternative variations for selecting a protocol to use. For example, a protocol can be selected randomly or the first available protocol can be used. Also, the protocol having the least traffic can be used. For example, in a Novell environment, library functions such as GetLocalTarget can return an estimate of the time required to deliver a 576-byte packet to a designated destination. These functions provide information related to network traffic using the corresponding protocol. A call to those functions can be used to obtain information indicating which protocol has the least traffic. Further, PII 255 can store a counter for each protocol (or access line) and can select the one that PII 255 has used the fewest times, or PII 255 can store a time at which each protocol (or access line) was last used and can select the one that was used least recently.

After selecting a protocol to transmit the data packet, flow advances to step S605 in which PII 255 retrieves a block of protocol specific information, i.e., a protocol specific address, from a protocol address mapping table stored in memory. The information is retrieved based on the access ID of the transmitting program and the access line corresponding to the selected protocol. If the mapping table does not have an entry for the Access ID/Access line pair, for example, if the packet is the first packet transmitted by PII 255 for a particular manager using a particular protocol, an entry is added to the table.

FIG. 9A illustrates an example of a protocol address mapping table created by PII 255. There is a one-to-one correspondence between an Access ID/Access line pair and a protocol specific address. Reference numeral 901 designates a column of Access ID/Access line pairs. Reference numeral 902 represents a column of protocol specific addresses that each include a protocol header of a type indicated in column 903. Each protocol header has a different format. The various protocol header formats are described in detail below with respect to FIGS. 10A–10C. However, regardless of type, each protocol header includes some type of address data, e.g., a socket for an IPX header, a port for a UDP header, and a socket and name for a DDP header. Reference numeral 904 indicates a column showing the specific address data included in each protocol header.

The address data indicated in column 904 represents standard address data that is defined for use by a particular manager and protocol. For example, the SNMP protocol (access ID XXXX2 in FIGS. 8A and 9A) uses the following address data: (1) for IPX, "socket" $900F_H$ and $9010_H$ (agent socket and trap socket, respectively), (2) for UDP, "port" $160_H$ and $161_H$, and (3) for DDP, a unique name "SNMP Agent" and "SNMP Trap Handler" and "socket" $8_H$ and $9_H$ (agent socket and trap socket, respectively). Likewise, the CMIP protocol uses specific address data such as a CMIP port for UDP, a CMIP socket for IPX, and a CMIP name and socket for DDP. An SNMP protocol packet and a CMIP protocol packet may have the same header type, but each header will include different specific address data. For example, the protocol specific addresses shown in rows 1 and 4 of FIG. 9A each have a UDP-type header, but each header contains different address data as shown in column 904. If SNMP manager 265 has access ID XXXX2, as indicated in FIG. 8A, and the preferred protocol UDP is being used and has access line #1, as indicated in FIG. 7A, then the protocol specific address in the fourth row of FIG. 9A will be retrieved by PII 255, which corresponds to Access ID/Access line pair XXXX2/1.

If the present invention is used with application programs that do not have predefined sockets, standard identification values must be defined for those application programs and the PIIs used with both manager and agent programs must be programmed to used those standard identification values.

Figure 10A:
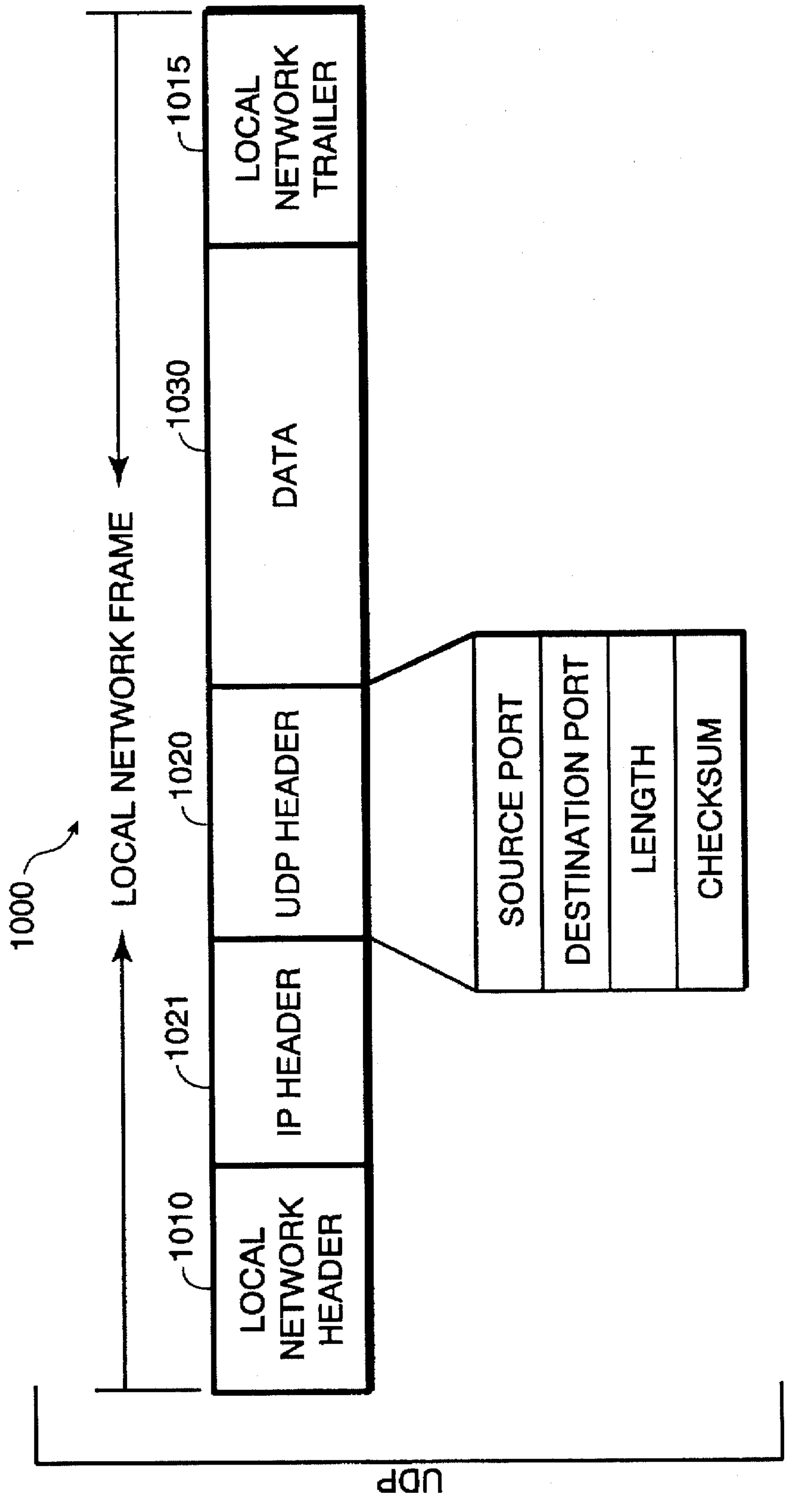
FIGS. 10A through 10C show examples of transmission packet formats for use with different protocols.
Figure 10B:
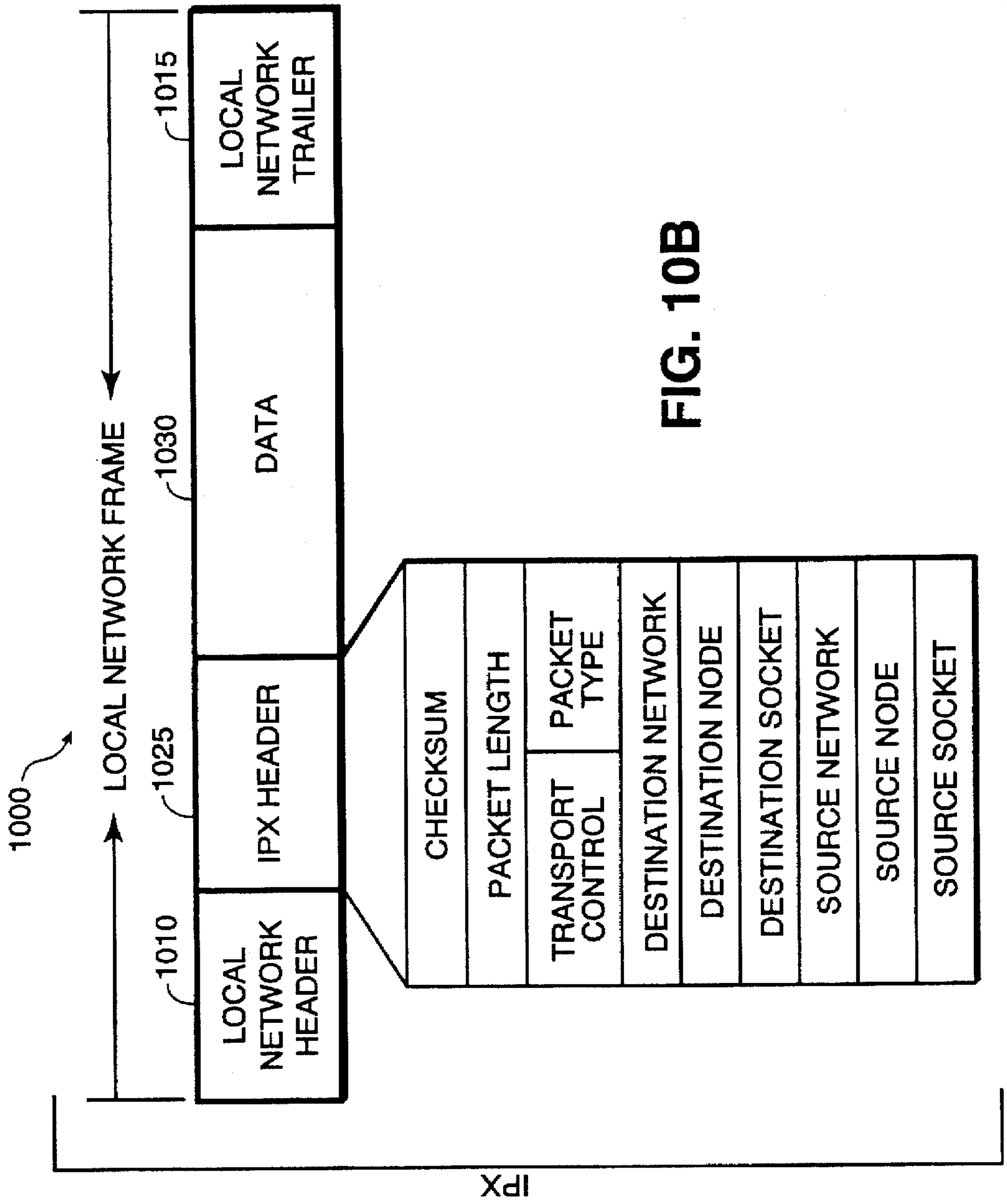
Figure 10C:
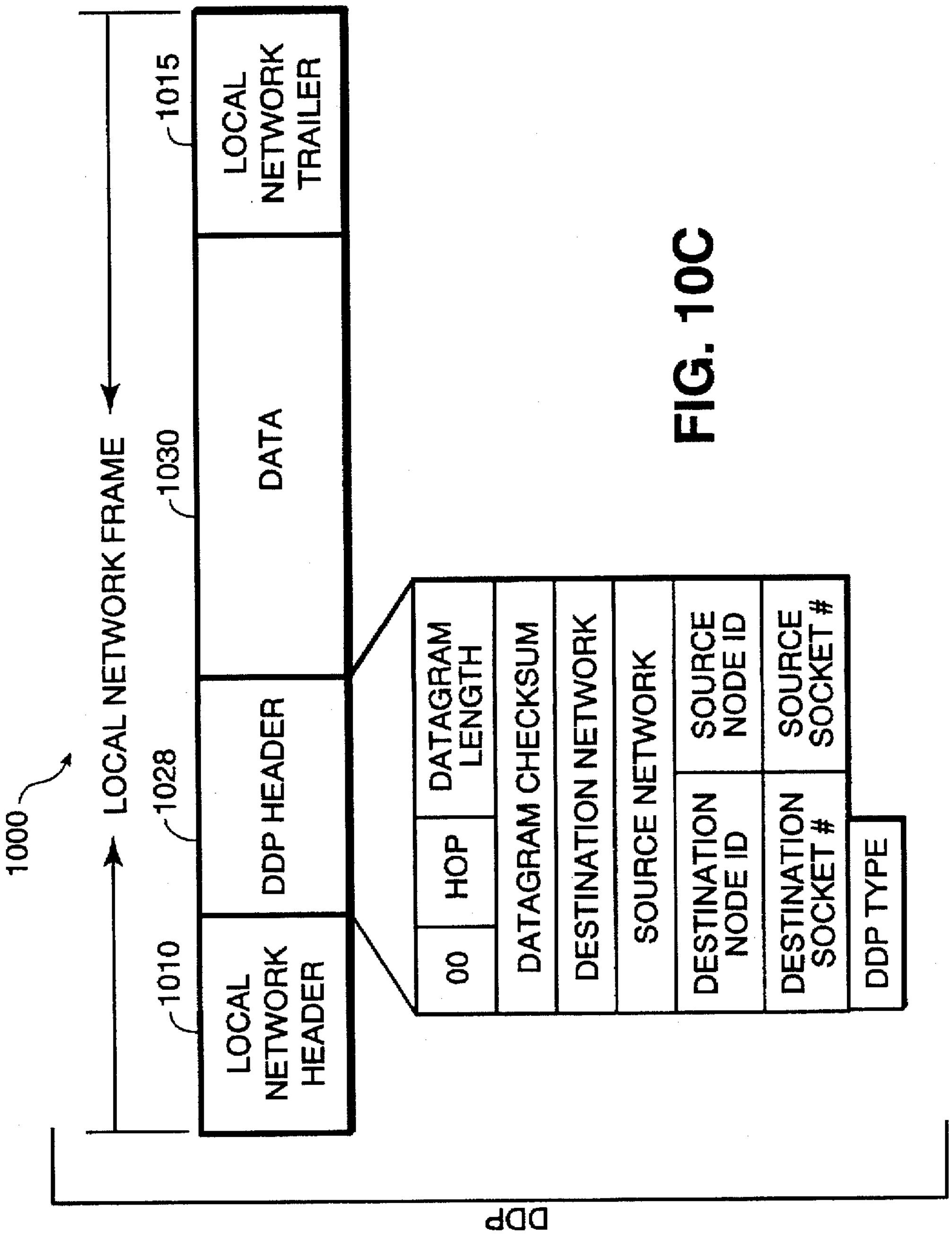

As mentioned above, each type of protocol header has a different format, as described with respect to FIGS. 10A–10C. FIG. 10A shows a format for a local network frame (or "transmission packet") 1000 when the frame is transmitted using a UDP protocol. In this case, network frame 1000 includes a local network header 1010 and a local network trailer 1015. It also includes an IP header 1021, a UDP header 1020, and data 1030. As shown in FIG. 10A, UDP header 1020 includes fields for a source port, a destination port, a length, and a checksum. FIG. 10B shows a format for network frame 1000 when the frame is transmitted using an IPX protocol. In that case, network frame 1000 does not include IP header 1021 and includes an IPX header 1025 in lieu of UDP header 1020. IPX header 1025 includes fields for a checksum, a packet length, a transport control value, a packet type, a destination network, a destination node, a destination socket, a source network, a source node, and a source socket. Lastly, FIG. 10C shows a format for network frame 1000 when the frame is transmitted using a DDP protocol. In this case, the network frame also lacks IP header 1021 and includes a DDP header 1028 instead of either UDP header 1020 or IPX header 1025. DDP header 1028 includes fields containing, 00, Hop, a datagram length, a datagram checksum, a destination network, a source network, a destination node ID, a source node ID, a destination socket number, a source socket number, and a DDP type.

Referring again to FIG. 6, after retrieving the protocol specific information, flow proceeds to step S606 in which PII 255 forms a transmission packet which is specific to the selected protocol, i.e., a network frame 1000 having one of the formats shown in FIGS. 10A–10C. The transmission frame is formed using the destination information provided by SNMP manager 265 and the information retrieved from the protocol address mapping table in step S605. Further, data 1030 is the data being sent by SNMP manager 265.

After forming transmission packet 1000, flow proceeds to step S607 in which transmission packet 1000 is transmitted to the destination application program via LAN 10.

Figure 11:
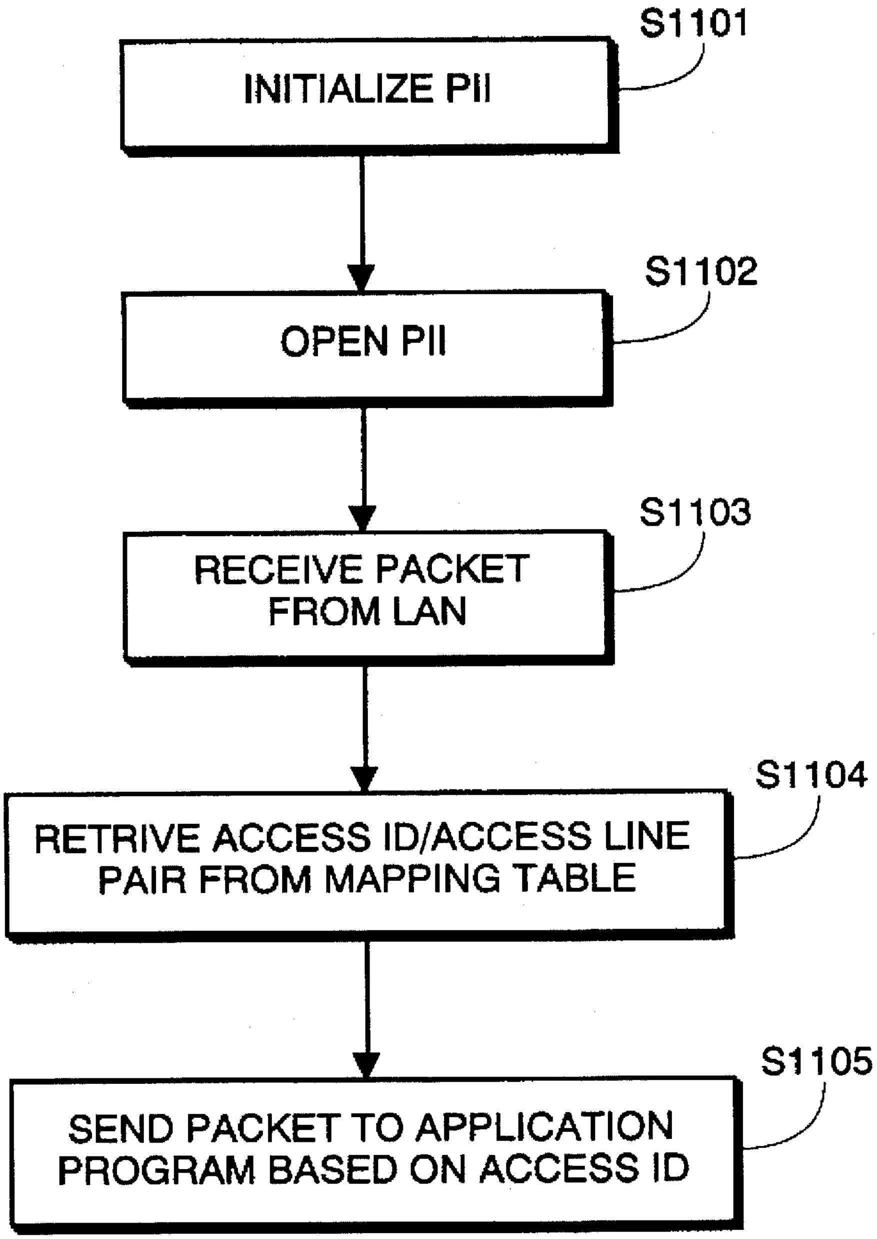
FIG. 11 is a flow diagram showing process steps for receiving a data packet transmitted from a first application program executing on one network device to a second application program executing on another network device.

FIG. 11 is a flow diagram showing process steps for receiving transmission packet 1000 at NEB 100. In step S1101, SNMP agent 260 issues a command to initialize PII 250. PII 250 must be initialized before it can receive data from LAN 10 or SNMP agent 260. As mentioned above, SNMP agent 260 obtains a table of entry points into routines of PII 250 upon initialization, and PII 250 determines which protocols are available by obtaining information from the PRETASK software module. FIG. 7B shows an exemplary protocol table that is set up and stored by PII 250 when UDP, IPX, and DDP protocols are available and access lines are assigned as shown in FIG. 3.

Flow then advances to step S1102 in which SNMP agent 260 issues a PII open command to obtain an access ID. FIG. 8B shows an exemplary mapping of access IDs to management agents that is set up and stored by PII 250, based on the exemplary assignment of access IDs shown in FIG. 3. In FIG. 8B, YYYY represents the MAC address of NEB 100. SNMP agent 260 is a passive entity which responds when SNMP manager 265 requests information but does not initiate communication. Accordingly, SNMP agent 260 listens for packets on all protocols that are available, i.e., packets addressed to any socket defined for SNMP use. Therefore, once an access ID is provided for an agent, e.g., SNMP agent 260, a mapping table is created with access ID/access line pair entries for every access line. FIG. 9B shows an exemplary protocol address mapping table for PII 250 based on the exemplary data in FIGS. 7A and 8A.

Flow then advances to step S1103 in which a transmission packet is received from LAN 10. Referring to FIG. 2, transmission packet 1000 is received from LAN 10 by network interface driver 210 and is routed to multiplexer software module 220 and then to one of protocol stacks 230–232. For example, when transmission packet 1000 represents data sent from SNMP manager 265 to SNMP agent 260 using the preferred UDP protocol, transmission packet 1000 is routed to UDP protocol stack 231. PII 250 listens for packets addressed to specific sockets, e.g., sockets defined for use by management programs, and ignores all others. Since transmission packet 1000 is addressed to one of the sockets to which PII 250 listens, PII 250 will receive the packet.

Flow then advances to step S1104 in which PII 250 obtains an Access ID/Access line pair based on protocol specific information 1020 in transmission packet 1000 by referring to the protocol address mapping table for PII 250 shown in FIG. 9B. For exemplary transmission packet 1000, Access ID/Access line pair YYYY1/2 will be retrieved from row 2 in FIG. 9B.

Flow then advances to step S1105 in which data 1030 is passed to the appropriate management program. This is done by referring to the access ID mapping information for PII 250, which is discussed above with reference to FIG. 8B. For example, Access ID YYYY1 corresponds to SNMP agent 260, so data 1030 of transmission packet 1000 is passed to SNMP agent 260.

Although an example has been described for transmitting data from a manager in PC 20 to an agent in NEB 100, the same process is applicable for transmitting data from NEB 100 to PC 20. Moreover, as discussed above, the present invention is not limited to transmission of data between management application programs and is not limited to network transmissions. Accordingly, while the preferred embodiment of the invention has been described, it is to be understood that the invention is not limited to the above-described embodiments and that various changes and modifications may be made by those of ordinary skill in the art without departing from the spirit and scope of the invention.

What is claimed is:

1. A protocol independent method of transmitting a data packet from a first application program executing on a first device which is interfaced to a local area network (LAN) to a second application program executing on a second device which is interfaced to the LAN, said method comprising the steps of:

initializing a protocol independent interface program which (i) determines which protocols are available for use, (ii) assigns an access line to each protocol available for use, (iii) assigns an access ID to the first application program, and (iv) creates mapping information that indicates a one-to-one correspondence between an access ID/access line pair and a block of protocol specific information which includes a protocol header having predetermined address data;

sending a data packet to the protocol independent interface program together with the access ID of the first application program and a destination ID for the second application program;

selecting one of the available protocols to transmit the data packet;

retrieving a block of protocol specific information from the mapping information based on the access ID of the first application program and the access line corresponding to the protocol selected in said selecting step;

forming a transmission packet including the data packet, the destination ID, and the retrieved block of protocol specific information; and transmitting the transmission packet to the second application program via the LAN.

2. A method according to claim 1, wherein said selecting step comprises determining whether a preferred protocol is available and selecting the preferred protocol if it is available.

3. A method according to claim 1, wherein said selecting step comprises determining which of the available protocols has the least traffic and selecting the protocol determined to have the least traffic.

4. A method according to claim 1, wherein said selecting step comprises determining which of the available protocols has been used least by the protocol independent interface program and selecting the protocol determined to have been used the least.

5. A method according to claim 1, wherein the second device is a network interface device which interfaces between a peripheral and the LAN and which executes a service routine, wherein said method further comprises the step of transmitting data packets including data to be serviced by the service routine.

6. A method of delivering a data packet received from a first application program executing on a first device which is interfaced to a local area network (LAN) to a second application program executing on a second device which is interfaced to the LAN, said method comprising the steps of:

receiving a protocol independent data packet from the first application program, together with data identifying the first application program and a destination ID identifying the second application program;

determining which protocols are available for use on the LAN;

selecting one of the available protocols to transmit the data packet;

determining protocol specific information including a protocol header having predetermined address data based on the data identifying the first application program and the protocol selected in said selecting step;

forming a transmission packet including the data packet, the destination ID, and the determined protocol specific information; and transmitting the transmission packet to the second application program via the LAN.

7. A method according to claim 6, wherein said selecting step comprises selecting a preferred protocol if it is available.

8. A method according to claim 6, wherein said selecting step comprises determining which of the available protocols has the least traffic and selecting the protocol determined to have the least traffic.

9. A method according to claim 6, wherein said selecting step comprises determining which of the available protocols has been used least by the protocol independent interface program and selecting the protocol determined to have been used the least.

10. A method according to claim 6, wherein the protocol independent interface program assigns a unique access ID to the first application program, assigns an access line to each available protocol, and creates mapping information having a one-to-one correspondence between each access ID/access line pair and a block of protocol specific information, and wherein said determining step comprises retrieving a block of protocol specific information from the mapping information based on the access ID of the first application program and the access line corresponding to the protocol selected in said selecting step.

11. A method according to claim 6, wherein the second device is a network interface device which interfaces between a peripheral and the LAN and which executes a service routine, wherein said method further comprises the step of transmitting data packets including data to be serviced by the service routine.

12. A method of receiving data which is transmitted from a first application program executing on a first device which is interfaced to a local area network (LAN) to a second application program executing on a second device which is interfaced to the LAN, said method comprising the steps of:

initializing a protocol independent interface program which (i) determines which protocols are available for use, (ii) assigns an access line to each protocol available for use, (iii) assigns a unique access ID to the second application program, and (iv) creates mapping information that indicates a one-to-one correspondence between an access ID/access line pair and a block of protocol specific information which includes a protocol header having predetermined address data;

receiving a transmission packet which includes data and a block of protocol specific information including a protocol header having predetermined address data;

retrieving from the mapping information the access ID/access line pair which corresponds to the block of protocol specific information contained in the received transmission packet; and sending the data contained in the received transmission packet to the second application program based on the access ID retrieved from the mapping information.

13. A method according to claim 12, wherein the second device is a network interface device which interfaces between a peripheral and the LAN and which executes a service routine, wherein said method further comprises the step of receiving data packets including data to be serviced by the service routine.

14. A network device which is interfaced to a local area network (LAN) and which transmits data from a first application program executing on said network device to a second application executing on another device interfaced to the LAN, said network device comprising:

a LAN interface for sending data to and receiving data from the LAN;

a storage device which stores an application program and a protocol independent interface program which (i) determines which protocols are available, (ii) assigns an access line to each available protocol, (iii) assigns an access ID to the first application program, and (iv) creates mapping information having a one-to-one correspondence between an access ID/access line pair and a block of protocol specific information which includes a protocol header having predetermined address data; and a processor which (i) executes the first application program, (ii) initializes the protocol independent interface program, (iii) processes a data packet which is generated by the first application program by selecting a protocol to transmit the data packet, retrieving a block of protocol specific information from the mapping information based on the access line corresponding to the selected protocol and the access ID of the first application program, and forming a transmission packet including a destination ID for the second application, the data packet, and the retrieved block of protocol specific information, and (iv) transmits the transmission packet via said LAN interface.

15. A network device according to claim 14, wherein said network device is a network interface device which interfaces between a peripheral and the LAN, and wherein said processor executes a service routine, receives data packets including data to be serviced by the service routine via said LAN interface, and services the data using the service routine.

16. A network device which is interfaced to a local area network (LAN) and which receives data that is transmitted from a first application program executing on another device interfaced to the LAN to a second application executing on said network device, said network device comprising:

a LAN interface for sending data to and receiving data from the LAN;

a storage device which stores the second application program and a protocol independent interface program which (i) determines which protocols are available, (ii) assigns an access line to each available protocol, (iii) assigns an access ID to the second application program, and (iv) creates mapping information having a one-to-one correspondence between an access ID/access line pair and a block of protocol specific information which includes a protocol header having predetermined address data; and a processor which (i) executes the second application program, (ii) initializes the protocol independent interface program, (iii) receives via said LAN interface a data packet which is transmitted by the first application program and which includes a block of protocol specific information, (iv) retrieves an access ID/access line pair from the mapping information which corresponds to the block of protocol specific information contained in the data packet, and (v) sends the data packet to the second application program based on the access ID retrieved from the mapping table.

17. A network device according to claim 16, wherein said network device is a network interface device which interfaces between a peripheral and the LAN, and wherein said processor executes a service routine, receives data packets including data to be serviced by the service routine via said LAN interface, and services the data using the service routine.

18. Computer-executable process steps stored on a computer-readable medium, the computer-executable process steps to transmit a data packet from a first application program executing on a first device which is interfaced to a local area network (LAN) to a second application program executing on a second device which is interfaced to the LAN, said computer-executable process steps comprising:

code to initialize a protocol independent interface program which (i) determines which protocols are available for use, (ii) assigns an access line to each protocol available for use, (iii) assigns an access ID to the first application program, and (iv) creates mapping information that indicates a one-to-one correspondence between an access ID/access line pair and a block of protocol specific information which includes a protocol header having predetermined address data;

code to send a data packet to the protocol independent interface program together with the access ID of the first application program and a destination ID for the second application program;

code to select one of the available protocols to transmit the data packet;

code to retrieve a block of protocol specific information from the mapping information based on the access ID of the first application program and the access line corresponding to the protocol selected in said selecting step;

code to form a transmission packet including the data packet, the destination ID, and the retrieved block of protocol specific information; and code to transmit the transmission packet to the second application program via the LAN.

19. Computer-executable process steps according to claim 18, wherein said code to select comprises code to determine whether a preferred protocol is available and code to select the preferred protocol if it is available.

20. Computer-executable process steps according to claim 18, wherein said code to select comprises code to determine which of the available protocols has the least traffic and code to select the protocol determined to have the least traffic.

21. Computer-executable process steps according to claim 18, wherein said code to select comprises code to determine which of the available protocols has been used least by the protocol independent interface program and code to select the protocol determined to have been used the least.

22. Computer-executable process steps according to claim 18, wherein the second device is a network interface device which interfaces between a peripheral and the LAN and which executes a service routine, and wherein the computer-executable process steps further comprise code to transmit data packets including data to be serviced by the service routine.

23. Computer-executable process steps stored on a computer-readable medium, the computer-executable process steps to deliver a data packet received from a first application program executing on a first device which is interfaced to a local area network (LAN) to a second application program executing on a second device which is interfaced to the LAN, said computer-executable process steps comprising:

code to receive a protocol independent data packet from the first application program, together with data identifying the first application program and a destination ID identifying the second application program;

code to determine which protocols are available for use on the LAN;

code to select one of the available protocols to transmit the data packet;

code to determine protocol specific information including a protocol header having predetermined address data based on the data identifying the first application program and the protocol selected by said code to select;

code to form a transmission packet including the data packet, the destination ID, and the determined protocol specific information; and code to transmit the transmission packet to the second application program via the LAN.

24. Computer-executable process steps according to claim 23, wherein said code to select comprises code to select a preferred protocol if it is available.

25. Computer-executable process steps according to claim 23, wherein said code to select comprises code to determine which of the available protocols has the least traffic and code to select the protocol determined to have the least traffic.

26. Computer-executable process steps according to claim 23, wherein said code to select comprises code to determine which of the available protocols has been used least by the protocol independent interface program and code to select the protocol determined to have been used the least.

27. Computer-executable process steps according to claim 23, wherein the protocol independent interface program assigns a unique access ID to the first application program, assigns an access line to each available protocol, and creates mapping information having a one-to-one correspondence between each access ID/access line pair and a block of protocol specific information, and wherein said code to determine comprises code to retrieve a block of protocol specific information from the mapping information based on the access ID of the first application program and the access line corresponding to the protocol selected by said code to select.

28. Computer-executable process steps according to claim 23, wherein the second device is a network interface device which interfaces between a peripheral and the LAN and which executes a service routine, wherein said computer-executable process steps further comprise code to transmit data packets including data to be serviced by the service routine.

29. Computer-executable process steps stored on a computer-readable medium, the computer-executable process steps to receive data which is transmitted from a first application program executing on a first device which is interfaced to a local area network (LAN) to a second application program executing on a second device which is interfaced to the LAN, said computer-executable process steps comprising:

code to initialize a protocol independent interface program which (i) determines which protocols are available for use, (ii) assigns an access line to each protocol available for use, (iii) assigns a unique access ID to the second application program, and (iv) creates mapping information that indicates a one-to-one correspondence between an access ID/access line pair and a block of protocol specific information which includes a protocol header having predetermined address data;

code to receive a transmission packet which includes data and a block of protocol specific information including a protocol header having predetermined address data;

code to retrieve from the mapping information the access ID/access line pair which corresponds to the block of protocol specific information contained in the received transmission packet; and code to send the data contained in the received transmission packet to the second application program based on the access ID retrieved from the mapping information.

30. Computer-executable process steps according to claim 29, wherein the second device is a network interface device which interfaces between a peripheral and the LAN and which executes a service routine, and wherein the computer-executable process steps further comprise code to receive data packets including data to be serviced by the service routine.

31. A computer-readable medium which stores computer-executable process steps, the computer-executable process steps to transmit a data packet from a first application program executing on a first device which is interfaced to a local area network (LAN) to a second application program executing on a second device which is interfaced to the LAN, the computer-executable process steps comprising:

an initializing step to initialize a protocol independent interface program which (i) determines which protocols are available for use, (ii) assigns an access line to each protocol available for use, (iii) assigns an access ID to the first application program, and (iv) creates mapping information that indicates a one-to-one correspondence between an access ID/access line pair and a block of protocol specific information which includes a protocol header having predetermined address data;

a sending step to send a data packet to the protocol independent interface program together with the access ID of the first application program and a destination ID for the second application program;

a selecting step to select one of the available protocols to transmit the data packet;

a retrieving step to retrieve a block of protocol specific information from the mapping information based on the access ID of the first application program and the access line corresponding to the protocol selected in said selecting step;

a forming step to form a transmission packet including the data packet, the destination ID, and the retrieved block of protocol specific information; and a transmitting step to transmit the transmission packet to the second application program via the LAN.

32. A computer-readable medium according to claim 31, wherein said selecting step comprises a determining step to determine whether a preferred protocol is available and a selecting step to select the preferred protocol if it is available.

33. A computer-readable medium according to claim 31, wherein said selecting step comprises a determining step to determine which of the available protocols has the least traffic and a selecting step to select the protocol determined to have the least traffic.

34. A computer-readable medium according to claim 31, wherein said selecting step comprises a determining step to determine which of the available protocols has been used least by the protocol independent interface program and a selecting step to select the protocol determined to have been used the least.

35. A computer-readable medium according to claim 31, wherein the second device is a network interface device which interfaces between a peripheral and the LAN and which executes a service routine, and wherein the computer-executable process steps further comprise a transmitting step to transmit data packets including data to be serviced by the service routine.

36. A computer-readable medium which stores computer-executable process steps, the computer-executable process steps to deliver a data packet received from a first application program executing on a first device which is interfaced to a local area network (LAN) to a second application program executing on a second device which is interfaced to the LAN, the computer-executable process steps comprising:

a receiving step to receive a protocol independent data packet from the first application program, together with data identifying the first application program and a destination ID identifying the second application program;

a determining step to determine which protocols are available for use on the LAN;

a selecting step to select one of the available protocols to transmit the data packet;

a determining step to determine protocol specific information including a protocol header having predetermined address data based on the data identifying the first application program and the protocol selected by said selecting step;

a forming step to form a transmission packet including the data packet, the destination ID, and the determined protocol specific information; and a transmitting step to transmit the transmission packet to the second application program via the LAN.

37. A computer-readable medium according to claim 36, wherein said selecting step comprises selecting a preferred protocol if it is available.

38. A computer-readable medium according to claim 36, wherein said selecting step comprises a determining step to determine which of the available protocols has the least traffic and a selecting step to select the protocol determined to have the least traffic.

39. A computer-readable medium according to claim 36, wherein said selecting step comprises a determining step to determine which of the available protocols has been used least by the protocol independent interface program and a selecting step to select the protocol determined to have been used the least.

40. A computer-readable medium according to claim 36, wherein the protocol independent interface program assigns a unique access ID to the first application program, assigns an access line to each available protocol, and creates mapping information having a one-to-one correspondence between each access ID/access line pair and a block of protocol specific information, and wherein said determining step comprises a retrieving step to retrieve a block of protocol specific information from the mapping information based on the access ID of the first application program and the access line corresponding to the protocol selected by the selecting step.

41. A computer-readable medium according to claim 36, wherein the second device is a network interface device which interfaces between a peripheral and the LAN and which executes a service routine, and wherein the computer-executable process steps further comprise a transmitting step to transmit data packets including data to be serviced by the service routine.

42. A computer-readable medium which stores computer-executable process steps, the computer-executable process steps to receive data which is transmitted from a first application program executing on a first device which is interfaced to a local area network (LAN) to a second application program executing on a second device which is interfaced to the LAN, the computer-executable process steps comprising:

an initializing step to initialize a protocol independent interface program which (i) determines which protocols are available for use, (ii) assigns an access line to each protocol available for use, (iii) assigns a unique access ID to the second application program, and (iv) creates mapping information that indicates a one-to-one correspondence between an access ID/access line pair and a block of protocol specific information which includes a protocol header having predetermined address data;

a receiving step to receive a transmission packet which includes data and a block of protocol specific information including a protocol header having predetermined address data;

a retrieving step to retrieve from the mapping information the access ID/access line pair which corresponds to the block of protocol specific information contained in the received transmission packet; and a sending step to send the data contained in the received transmission packet to the second application program based on the access ID retrieved from the mapping information.

43. A computer-readable medium according to claim 42, wherein the second device is a network interface device which interfaces between a peripheral and the LAN and which executes a service routine, and wherein the computer-executable process steps further comprise a receiving step to receive data packets including data to be serviced by the service routine.

* * * * *